United States Patent
Sedlak et al.

(10) Patent No.: US 9,432,630 B2
(45) Date of Patent: *Aug. 30, 2016

(54) SYSTEM AND METHOD FOR TRANSMITTING FREQUENTLY CONTENT ITEMS

(71) Applicant: OpenTV, Inc., San Francisco, CA (US)

(72) Inventors: Brian Sedlak, Highlands Ranch, CO (US); Thomas Lemmons, Evergreen, CO (US); Gary Rasmussen, Parker, CO (US); Ian Zenoni, Highlands Ranch, CO (US); Thomas Huber, Arvada, CO (US)

(73) Assignee: OpenTV, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/708,057

(22) Filed: May 8, 2015

(65) Prior Publication Data
US 2015/0244988 A1 Aug. 27, 2015

Related U.S. Application Data

(63) Continuation of application No. 13/848,073, filed on Mar. 21, 2013, now Pat. No. 9,032,088, which is a continuation of application No. 12/984,413, filed on Jan. 4, 2011, now Pat. No. 8,429,290, which is a
(Continued)

(51) Int. Cl.
*G06F 15/16* (2006.01)
*H04N 7/173* (2011.01)
(Continued)

(52) U.S. Cl.
CPC ...... *H04N 7/17336* (2013.01); *H04L 65/4092* (2013.01); *H04N 21/23109* (2013.01);
(Continued)

(58) Field of Classification Search
CPC ............ H04N 7/17336; H04N 21/65; H04N 21/23113; H04N 21/488; H04N 21/23109; H04N 21/6581; H04N 21/4886; H04N 21/60; H04L 65/4092
USPC .......................... 709/233, 232; 725/105, 118
See application file for complete search history.

(56) References Cited

U.S. PATENT DOCUMENTS 5,533,034 A 7/1996 Kuwata et al.
5,559,810 A 9/1996 Gilbert et al.
(Continued)

FOREIGN PATENT DOCUMENTS

WO WO-02063803 A2 8/2002

OTHER PUBLICATIONS

"U.S. Appl. No. 10/067,460, Advisory Action mailed Jan. 18, 2008", 3 pgs.
(Continued)

*Primary Examiner* — Hoang-Vu A Nguyen-Ba
(74) *Attorney, Agent, or Firm* — Schwegman Lundberg & Woessner, P.A.

(57) ABSTRACT

Disclosed is a system that optimizes transmission of content. Requests for a content type and an element within the content type is received Most frequently requested content types and most frequently requested elements within each of the most frequently requested content types are determined. A transmit rate for each of the frequently requested content types is determined, wherein the frequently requested content types with a higher request count receive a higher transmit rate than frequently requested content types with a lower request count. The most frequently requested elements within each of the most frequently requested content types are transmitted at the determined transmit rate.

20 Claims, 6 Drawing Sheets

Related U.S. Application Data continuation of application No. 10/067,460, filed on Feb. 4, 2002, now Pat. No. 7,870,283.

(60) Provisional application No. 60/266,335, filed on Feb. 2, 2001.

(51) Int. Cl.

| | | |
|---|---|---|
| *H04L 29/06* | (2006.01) | |
| *H04N 21/60* | (2011.01) | |
| *H04N 21/231* | (2011.01) | |
| *H04N 21/488* | (2011.01) | |
| *H04N 21/658* | (2011.01) | |
| *H04N 21/65* | (2011.01) | |

(52) U.S. Cl.
CPC ...... *H04N21/23113* (2013.01); *H04N 21/488* (2013.01); *H04N 21/4886* (2013.01); *H04N 21/60* (2013.01); *H04N 21/65* (2013.01); *H04N 21/6581* (2013.01)

(56) References Cited

U.S. PATENT DOCUMENTS

| | | | |
|---|---|---|---|
| 5,566,175 A | | 10/1996 | Davis |
| 5,572,442 A | | 11/1996 | Schulhof et al. |
| 5,631,694 A | | 5/1997 | Aggarwal et al. |
| 5,826,031 A | | 10/1998 | Nielsen |
| 5,845,090 A | | 12/1998 | Collins, III et al. |
| 5,845,279 A | | 12/1998 | Garofalakis et al. |
| 5,956,716 A | * | 9/1999 | Kenner ............ G06F 17/30017 |
| 6,023,722 A | | 2/2000 | Colyer |
| 6,134,596 A | | 10/2000 | Bolosky et al. |
| 6,247,058 B1 | | 6/2001 | Miller et al. |
| 6,389,457 B2 | | 5/2002 | Lazaridis et al. |
| 6,879,768 B1 | | 4/2005 | Ono et al. |
| 7,301,944 B1 | | 11/2007 | Redmond |
| 7,661,119 B1 | | 2/2010 | Arsenault et al. |
| 7,870,283 B2 | * | 1/2011 | Sedlak ............... H04N 7/17336 709/232 |
| 8,429,290 B2 | * | 4/2013 | Sedlak ............... H04N 7/17336 709/232 |
| 9,032,088 B2 | * | 5/2015 | Sedlak ............... H04N 7/17336 709/232 |
| 2002/0087688 A1 | * | 7/2002 | Kamentsky ............ H04L 29/06 709/225 |
| 2002/0108117 A1 | | 8/2002 | Sedlak et al. |
| 2006/0050659 A1 | | 3/2006 | Corson et al. |
| 2006/0259944 A1 | | 11/2006 | Tash |
| 2011/0099288 A1 | | 4/2011 | Sedlak et al. |
| 2013/0212635 A1 | | 8/2013 | Sedlak et al. |

OTHER PUBLICATIONS

"U.S. Appl. No. 10/067,460, Advisory Action mailed Mar. 10, 2010", 3 pgs.

"U.S. Appl. No. 10/067,460, Examiner Interview Summary mailed Feb. 9, 2010", 3 pgs.

"U.S. Appl. No. 10/067,460, Final Office Action mailed Oct. 24, 2007", 10 pgs.

"U.S. Appl. No. 10/067,460, Final Office Action mailed Dec. 24, 2009", 15 pgs.

"U.S. Appl. No. 10/067,460, Non Final Office Action mailed May 18, 2007", 10 pgs.

"U.S. Appl. No. 10/067,460, Non-Final Office Action mailed Apr. 14, 2010", 13 pgs.

"U.S. Appl. No. 10/067,460, Non-Final Office Action mailed May 13, 2008", 13 pgs.

"U.S. Appl. No. 10/067,460, Non-Final Office Action mailed May 29, 2009", 13 pgs.

"U.S. Appl. No. 10/067,460, Non-Final Office Action mailed Dec. 23, 2008", 12 pgs.

"U.S. Appl. No. 10/067,460, Notice of Allowance mailed Sep. 30, 2010", 6 pgs.

"U.S. Appl. No. 10/067,460, Response filed Feb. 24, 2010 to Final Office Action mailed Dec. 24, 2009", 11 pgs.

"U.S. Appl. No. 10/067,460, Response filed Mar. 11, 2009 to Non-Final Office Action mailed Dec. 23, 2008", 10 pgs.

"U.S. Appl. No. 10/067,460, Response filed Aug. 15, 2007 to Non Final Office Action mailed May 18, 2007", 11 pgs.

"U.S. Appl. No. 10/067,460, Response filed Aug. 16, 2010 to Non Final Office Action mailed Apr. 14, 2010", 8 pgs.

"U.S. Appl. No. 10/067,460, Response filed Aug. 31, 2009 to Non Final Office Action mailed May 29, 2009", 10 pgs.

"U.S. Appl. No. 10/067,460, Response filed Oct. 14, 2008 to Non-Final Office Action mailed May 13, 2008", 9 pgs.

"U.S. Appl. No. 10/067,460, Response filed Dec. 20, 2007 to Final Office Action mailed Oct. 24, 2007", 8 pgs.

"U.S. Appl. No. 12/984,413, Non Final Office Action mailed Aug. 31, 2012", 8 pgs.

"U.S. Appl. No. 12/984,413, Notice of Allowance mailed Feb. 15, 2013", 5 pgs.

"U.S. Appl. No. 12/984,413, Response filed Dec. 31, 2012 to Non Final Office Action mailed Aug. 31, 2012", 10 pgs.

"U.S. Appl. No. 13/848,073, Non Final Office Action mailed Jul. 15, 2014", 12 pgs.

"U.S. Appl. No. 13/848,073, Notice of Allowance mailed Jan. 13, 2015", 7 pgs.

"U.S. Appl. No. 13/848,073, Preliminary Amendment filed Jul. 3, 2013", 9 pgs.

"U.S. Appl. No. 13/848,073, Response filed Nov. 17, 2014 to Non Final Office Action mailed Jul. 15, 2014", 10 pgs.

"European Application Serial No. 02709330.1, Office Action mailed Nov. 10, 2006", 4 pgs.

"European Application Serial No. 02709330.1, Response filed Mar. 20, 2007 to Office Action mailed Nov. 10, 2006", 12 pgs.

"European Application Serial No. 02709330.1, Response filed Mar. 30, 2007", 14 pgs.

"International Application Serial No. PCT/US02/03265, International Search Report mailed Mar. 6, 2003", 2 pgs.

* cited by examiner

SYSTEM AND METHOD FOR TRANSMITTING FREQUENTLY CONTENT ITEMS

CROSS REFERENCE TO RELATED APPLICATIONS

This application is a continuation of U.S. application Ser. No. 13/848,073, filed on Mar. 21, 2013, which is a continuation of U.S. application Ser. No. 12/984,413, filed on Jan. 4, 2011, now U.S. Pat. No. 8,429,290, issued on Apr. 23 2013, which is a continuation of U.S. application Ser. No. 10/067,460, filed on Feb. 4, 2002, now U.S. Pat. No. 7,870,283, issued on Jan. 11, 2011, which claims the benefit of priority of U.S. Provisional Application No. 60/266,335, filed Feb. 2, 2001, which applications are incorporated herein by reference in their entirety.

BACKGROUND OF THE INVENTION a. Field of Invention

The present invention pertains generally to broadband networks and more specifically to a method of efficiently utilizing available bandwidth to provide video, streaming media image and information desired by users of a broadband network.

b. Description of the Background

Broadband is a form of data transmission in which a single medium, such as a wire, cable or satellite link, for example, can carry several channels at once. In contrast, baseband transmission allows only one signal at a time. Cable television systems use broadband transmission for television program distribution. In addition to program content such as television programs, cable systems may also provide Internet connections employing cable modems. Cable system Internet support employs both upstream and downstream data transfers. Such data transfers may also be employed to support interactive television. Interactive television may furnish viewers additional information such as a news item display or a stock ticker that may be scrolled across the bottom of the screen, for example. Cable system data transmissions may comprise both isochronous and asynchronous transfers. Isochronous transfers are constant data rate transfers as may be used for streaming audio and video where a regular data transfer rate is needed to maintain picture or audio quality. Asynchronous transfers may vary in data rate and may exhibit burstiness as channel bandwidth becomes available. A cable system typically employs isochronous transfers for program content such as movies and may support isochronous transfers to support QoS (Quality of Service) data transfer modes as specified by DOCSIS (Data Over Cable System interface Specification). Asynchronous transfers are employed for other data services, such as DOCSIS 'best effort' modes, and data transfer rate may vary with the number of users, size of files being transferred, and bandwidth allocated to isochronous transfer. The bandwidth of a cable system is divided among broadcast programs, subscriber services, and Internet data transfers. Internet or interactive television users may subscribe to news and data services where information may be sent to users at sonic regular interval or in response to a particular event. Further, users may log on to services that provide less than real time video, such as cameras showing weather or traffic for example, As the number of modem users or interactive users increase, system performance may decrease, resulting in a reduction in service that may result reduced customer satisfaction or reduced revenues. In order to optimize revenue and maintain customer satisfaction, a method of network management is needed that optimizes data services to a large base of users while preserving a level of service quality.

SUMMARY OF THE INVENTION

The present invention overcomes the disadvantages and limitations of the prior art by providing a system and method for dynamically controlling the content and frequency of transmission of data elements over a network.

The present invention may therefore comprise a method for transmitting requested content items in a broadband transmission system comprising: receiving requests for a plurality of content items on an upstream path of the broadband transmission system; creating a list of the content items; creating a request count for each content item of the plurality of content items; sorting the requests using the count; and transmitting content items with a higher count more frequently than content items with a lower count.

The present invention may further comprise a system for optimizing bandwidth utilization in a broadband transmission system comprising: a first database containing a plurality of content items; a second database containing user request information for the content items; a transmit unit; a server computer; and a software program that processes the request information received across the broadband transmission system and determines a rate of request for each content item of the plurality of content items in the first database and establishes a frequency of transmission for each content item of the plurality of content items in the first database responsive to the rate of request for each content item of the plurality of content items in the first database.

An advantage of the present invention is that it allows selection and transmission of content items to users over a broadband network in a highly efficient manner. By transmitting some content items less frequently, bandwidth is made available which may be used to support additional users or to provide a wider variety of content items, providing an opportunity for increased revenue and greater user satisfaction. Content items may comprise news, weather, stock information and broadcast programs such as movies. Users may submit requests to add or delete content items through an on screen menu, Internet website or other interface. Requests are processed by the system of the present invention to produce a list of requested content items and the number of times each content item has been requested. Content items for which there are no requests are removed from the list of requested content items. Content items are sorted relative to the number of requests made for that content item and placed in transmit packages. Transmit packages may include minimum content request information such that only content items which have a request count greater than a predetermined number are placed in that transmit package. Content items that have a lower request count are broadcast less frequently than content items that have a higher request count number of requests. For example, if sports scores are shown across the bottom of a displayed image, scores for teams for which there are more requests will be displayed more frequently than scores for teams for which there are fewer requests.

Transmit packages are further processed by a transmit process which determines the transmit time needed for each package. Packages are supplied to a transmit queue and are transmitted. The system and method of the present invention may be implemented as part of a cable television system operator server, or may be implemented on a separate server.

The invention may also be used to create part of a higher bandwidth transmission stream. For example, the system and method of the present invention may be used to organize and control the content of stock quotes supplied to a broadcaster from a news service that are then displayed in a lower portion of the screen during newscasts. The present invention may be used to determine the frequency of broadcast of content items based on the duration of content items, the frequency of request of the content items, and the bandwidth available for broadcast of the content items. In this manner, if a broadcaster provides a substantially constant bandwidth for broadcast of news, for example, the system and method of the present invention may provide a set of content items and broadcast frequency such that the provided bandwidth is utilized without dead time when no content items are displayed.

Depending on available bandwidth, the system and method of the present invention may be used to transmit only those content items for which there is sonic minimum number of requests. The invention is applicable but not limited to audio programming, video programming, and data transmission. The invention may also be employed to manage data transmission to wireless data devices.

BRIEF DESCRIPTION OF THE DRAWINGS

In the figures.

DETAILED DESCRIPTION OF THE INVENTION

Figure 1:
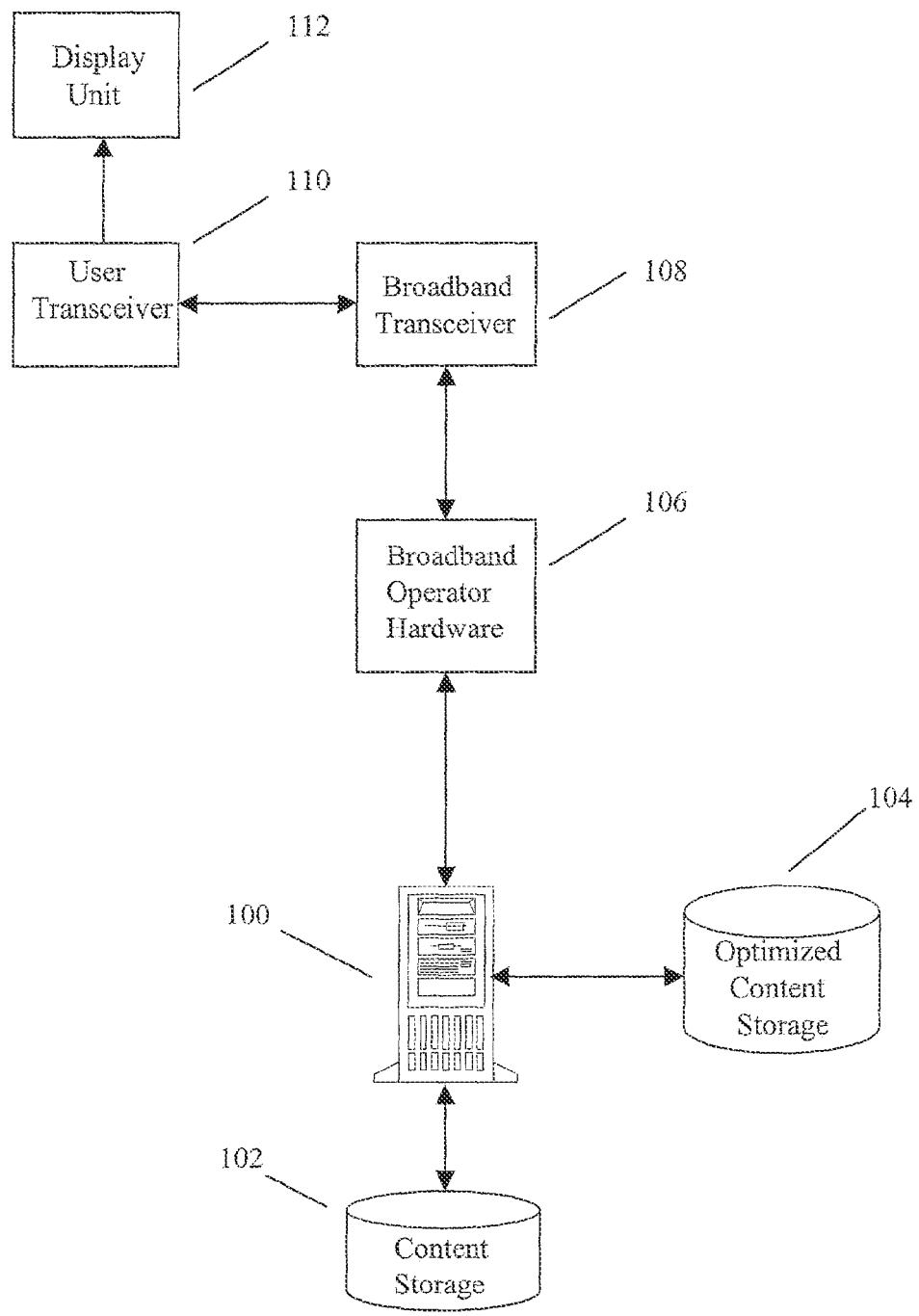
FIG. 1 is a system overview block diagram.

FIG. 1 is a system overview block diagram. Display unit 112 and user transceiver 110 allow the user to view program content and to interact with the system of the present invention. Display unit 112 may be a television, computer monitor or other device. User transceiver 110 may be a set top box, modem, satellite interface or other device. User transceiver 110 communicates with broadband transceiver 108 and may be used to make requests for content items, Broadband transceiver 108 communicates with broadband operator hardware 106 which may be equipment operated by a cable television company. Broadband operator hardware 106 communicates with bandwidth optimization server 100 that processes content items requests from users. Bandwidth optimization server 100 utilizes content storage 102 to create optimized content that may be stored in optimized content storage 104. Alternatively, optimized content storage 104 may contain an index or listing of optimized content that then may be retrieved from content storage 102. Bandwidth optimization server 100 transfers optimized content to broadband operator hardware 106 for transmission to users through broadband transceiver 108.

Figure 2:
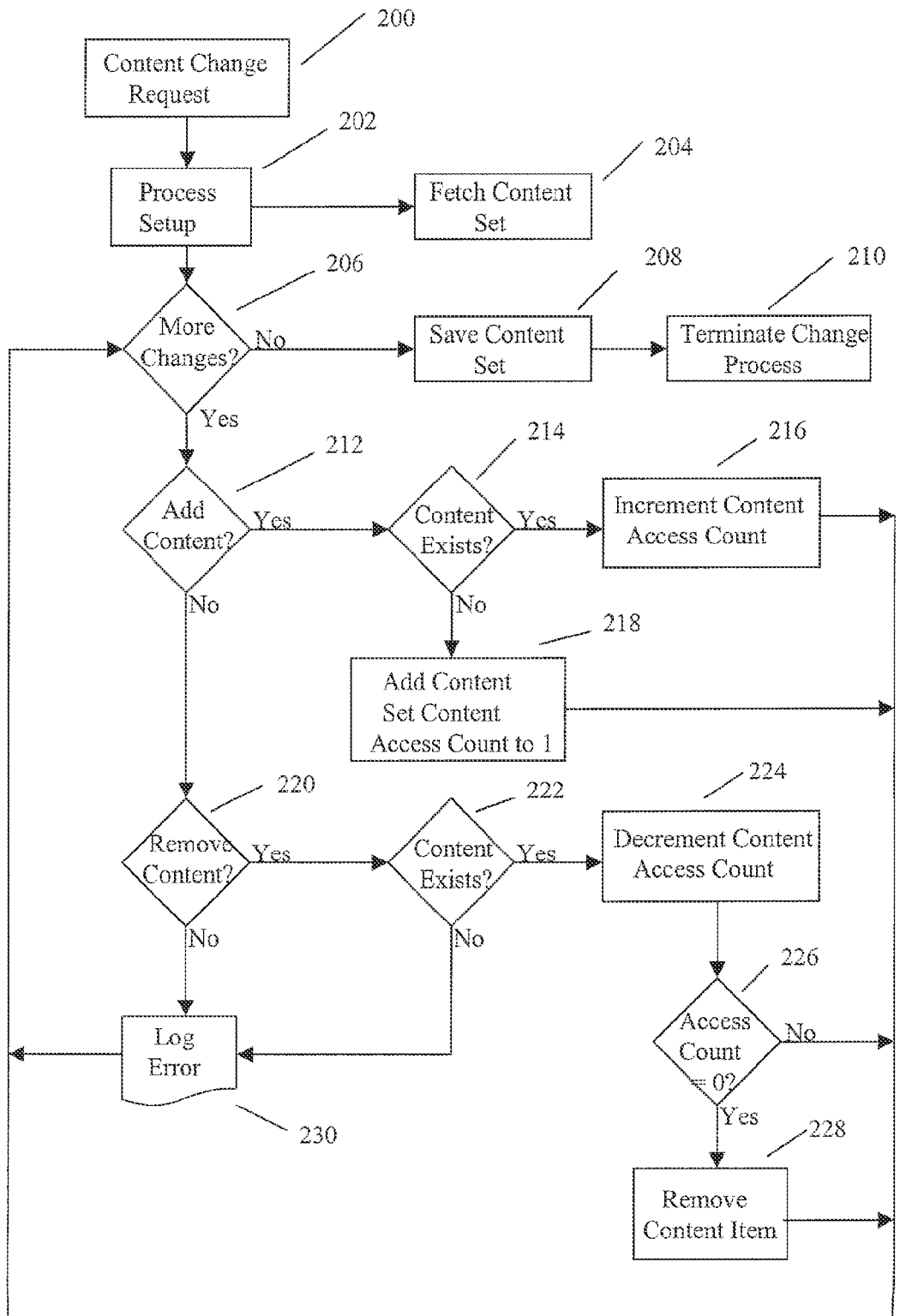
FIG. 2 depicts a flowchart for a content filter process.

FIG. 2 depicts a flowchart for a content filter process. The content filter process adds or removes content items from the content set and provides a count of the number of requests for each content item. Users submit content requests using all on-screen menu, Internet connection, or other method that result in a content change request 200. Processing of content change request 200 begins with process setup step 202 which performs fetch content set step 204 and may perform other tasks such as locking the current content set and other actions such that broadcast of content may continue while the content set is updated. Step 206 checks if there are more changes. When all changes have been made, step 208 saves the content set and step 210 terminates the change process. Terminating the change process may include actions to unlock and use the current content set for broadcast. When changes have not been made, step 206 routes changes to step 212 where the change is examined to see if it is an add content change. If the result of step 212 is that the change is an add content change, step 214 checks if the content item exists in the current content set. If the result of step 214 is that the item is already in the content set, increment content access count step 216 is performed. Processing then returns to step 206 which checks if there are more changes. If the result of step 214 is that the content item is not in the current content set, step 218 adds the content item to the content set and sets the access count to one. Processing then returns to step 206 which checks if there are more changes. If the result of step 212 is that the change is not an add content change, step 220 checks if the change is to remove content. If the change is not to remove content, error log step 230 saves change information and processing returns to step 206. If step 220 determines that the change is to remove content, step 255 checks if the content item exists in the current content set. If the content does not exist in the current content set, error tog step 230 saves change information and processing returns to step 206. If step 222 determines that the content does exists in the current content set, step 260 decrements the content access count. Ste 226 checks if the content access count is equal to zero. If the result of step 226 is that the access count is not zero, processing returns to step 206. If the result of step 226 is that the content access count is equal to zero, step 228 removes the content item from the current content set. Processing then returns to step 206.

Figure 3:
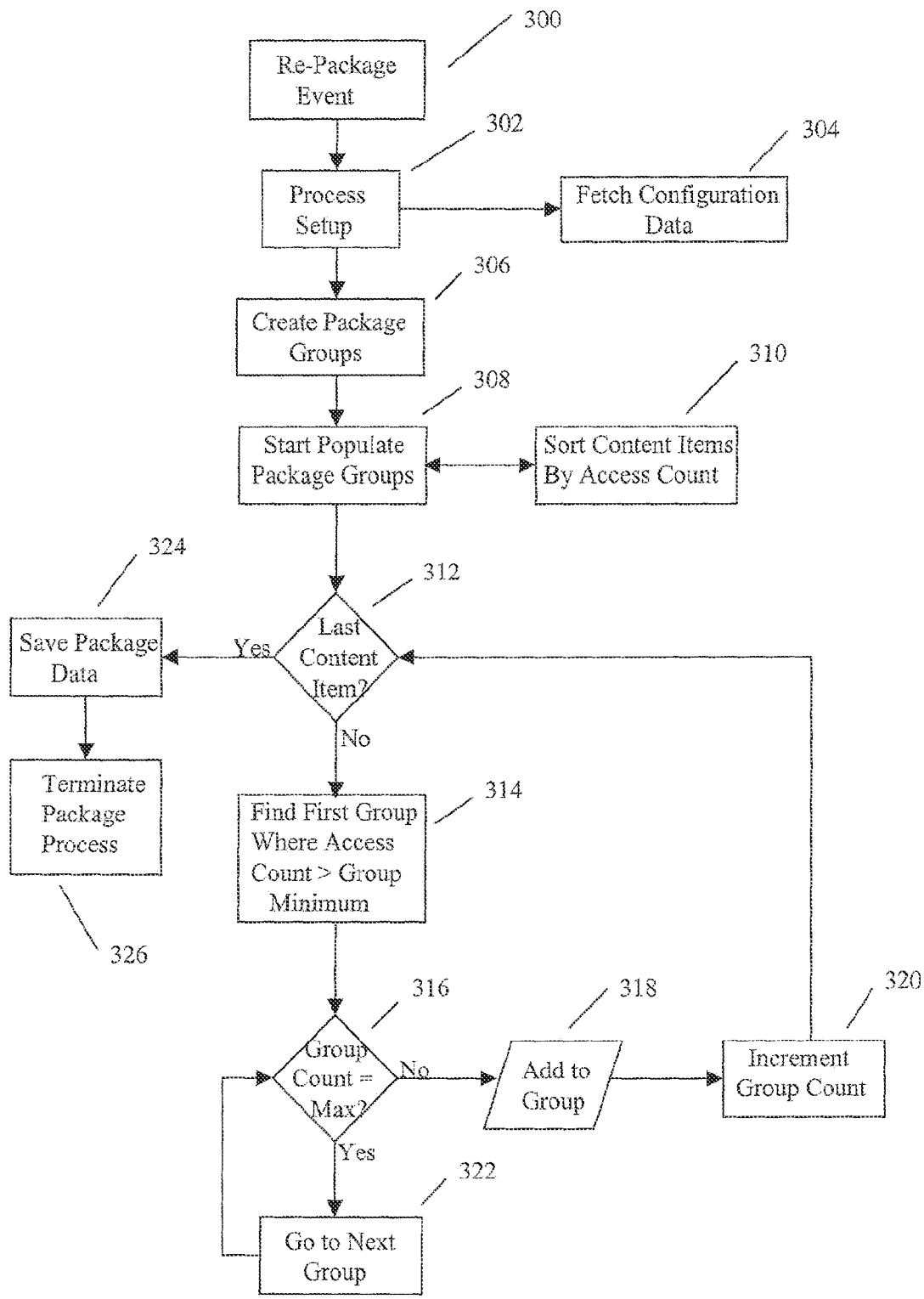
FIG. 3 depicts a flowchart for content group packaging.

FIG. 3 depicts a flowchart for content group packaging. Content group packaging assembles most frequently requested content items into package groups for broadcast. Content group packaging employs content information including access count and duration, plus available bandwidth of the broadcast system. Repackaging occurs whenever scheduled by a broadband operator. Repackage event 300 invokes process setup step 302 which performs fetch configuration data step 304 and may include other actions such as data set locking to support broadcast with previous configuration data while configuration data is updated. Configuration data may include the maximum number of packages to create, the maximum package size, and maximum bandwidth timing that may be used to calculate retransmission repeat rates for each package. At step 306, package groups are created using the configuration data fetched in step 304. At step 308, the package groups are populated using content items sorted by access count in step 310. Each package group contains information for the package retransmit rate, the package priority, the package size, the maximum package size and the minimum content request count. The package retransmit rate indicates how often the package should be transmitted and may be calculated or may be assigned a value through configuration, The package priority indicates the priority of the package that reflects the position of the package when sorted by access count in step 310. Step 312 checks if the last content item has been placed in a package group. If the result of step 312 is that the last content item has not been placed in a group, step 314 examines groups and finds the first group where the access count of the content item is greater than the minimum access count for that group, thereby providing for content items with higher access counts to be grouped in the same group. Step 316 examines the group found in step 314 to determine if the current group count plus the size of the content item size exceeds the maximum package size. If the result of step 316 is that the maximum package size is not exceeded, the item is added to the group in step 318 and the group count is incremented in step 320. Processing then continues at step 312. If the result of step 316 is that the maximum group count would be exceeded, step 322 selects the next group and step 316 is again performed. Steps 316 and 322 are performed until a group is found that has sufficient remaining size to include the content item. When step 312 determines that the last content item has been processed, step 324 saves the package data. Step 326 terminates the package process. Terminating the package process may include actions to unlock the data and make it available for use in broadcast.

Figure 4:
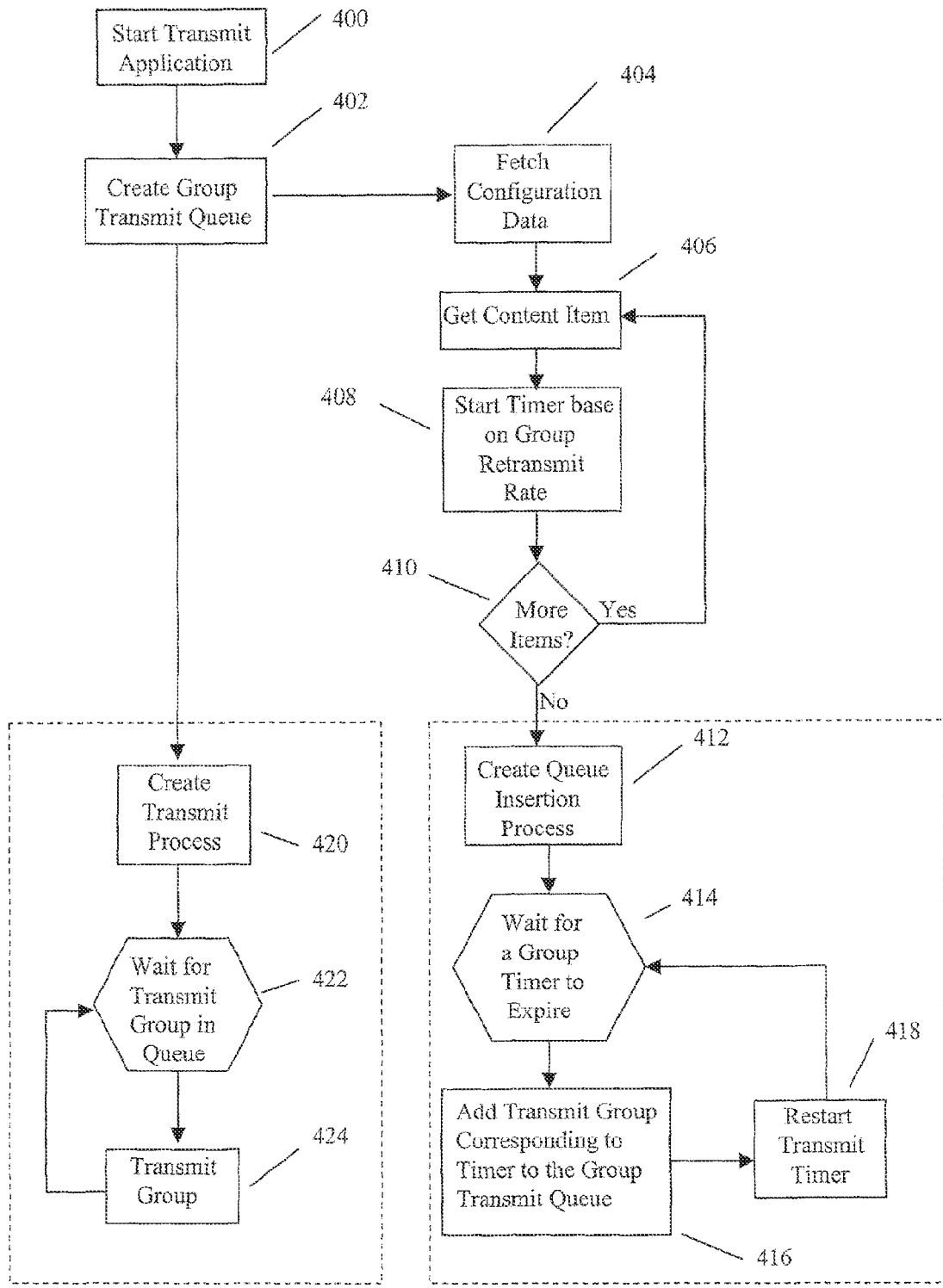
FIG. 4 depicts a flowchart for group transmission.

FIG. 4 depicts a flowchart for group transmission. Package group transmission is the process of supplying package groups to the broadband system for transmission to users. Start transmit application 400 first performs step 402 to create a group transmit queue. Creating a group transmit queue may employ concurrent processes as depicted by dotted outline in FIG. 4. Steps 420 to 424 comprise a process that may operate concurrently with steps 412 through 418. Step 404 fetches configuration data that includes the number of groups, group timing information, the group priority and the group retransmit rate. Step 406 retrieves a content item from a group. Step 408 creates time information for each package group. Step 410 determines if more content items exist in the group. If more items exist in the group, step 406 gets the next content item from the group and step 408 adds time information from the content item. When step 410 determines that all content items have been processed, timer information is passed to queue insertion process step 412. Step 414 waits for a group timer to expire. When a group timer expires, step 416 adds the transmit group processed by steps 406 through 410 to the transmit queue. Step 418 restarts the transmit timer after which step 414 waits for this timer to expire and then adds the next group to the transmit queue. Concurrently with steps 412 to 418, the transmit process comprising steps 420 to 424 may be executed. Step 420 creates a transmit process. The transmit queue is a FIFO that step 422 examines to determine if there is a group in the queue. If a group is present in the queue, step 424 transmits the group and then step 422 determines if there is a next group in the queue. If a group is not present in the queue, step 422 waits until a group is placed in the queue from the process comprising steps 412 to 418.

The present invention optimizes available bandwidth by transmitting most requested information more frequently than less requested information. For example, if football scores are displayed in a lower portion of a television screen in response to viewer request, updates of scores for the most frequently requested teams may be displayed most often and scores of less requested teams may be displayed less often. Since cable systems are regional entities, viewers will likely most frequently request information for local teams, teams that may affect the standing of the local teams, and the like. Regional preferences for information may also apply to stock information.

Figure 5:
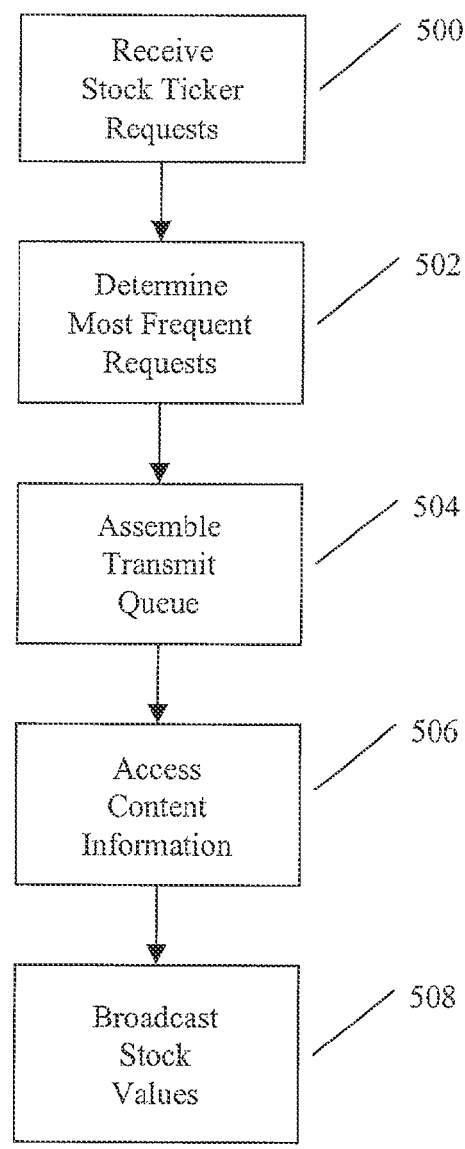
FIG. 5 is a flowchart of the method of the present invention as may be applied to displaying stock prices.

FIG. 5 is a flowchart of the method of the present invention as may be applied to displaying stock prices. At step 500, requests are received from viewers for prices of stock for a group of companies, If the cable system is located in a region that produces automobiles, for example, requests for automobile company stock prices may be most frequently received. At step 502, the most frequent requests are determined. The determination may include a time average of requests updated at a predetermined interval. At step 504, current information is accessed. Access may employ a query of network accessible databases. At step 506 a transmit queue is assembled. The transmit queue reflects the frequency of request such that, for example, stock prices for automobile companies may be displayed once every minute whereas stock prices for less frequently requested companies may be displayed every three minutes. At step 508 the stock prices are broadcast.

Figure 6:
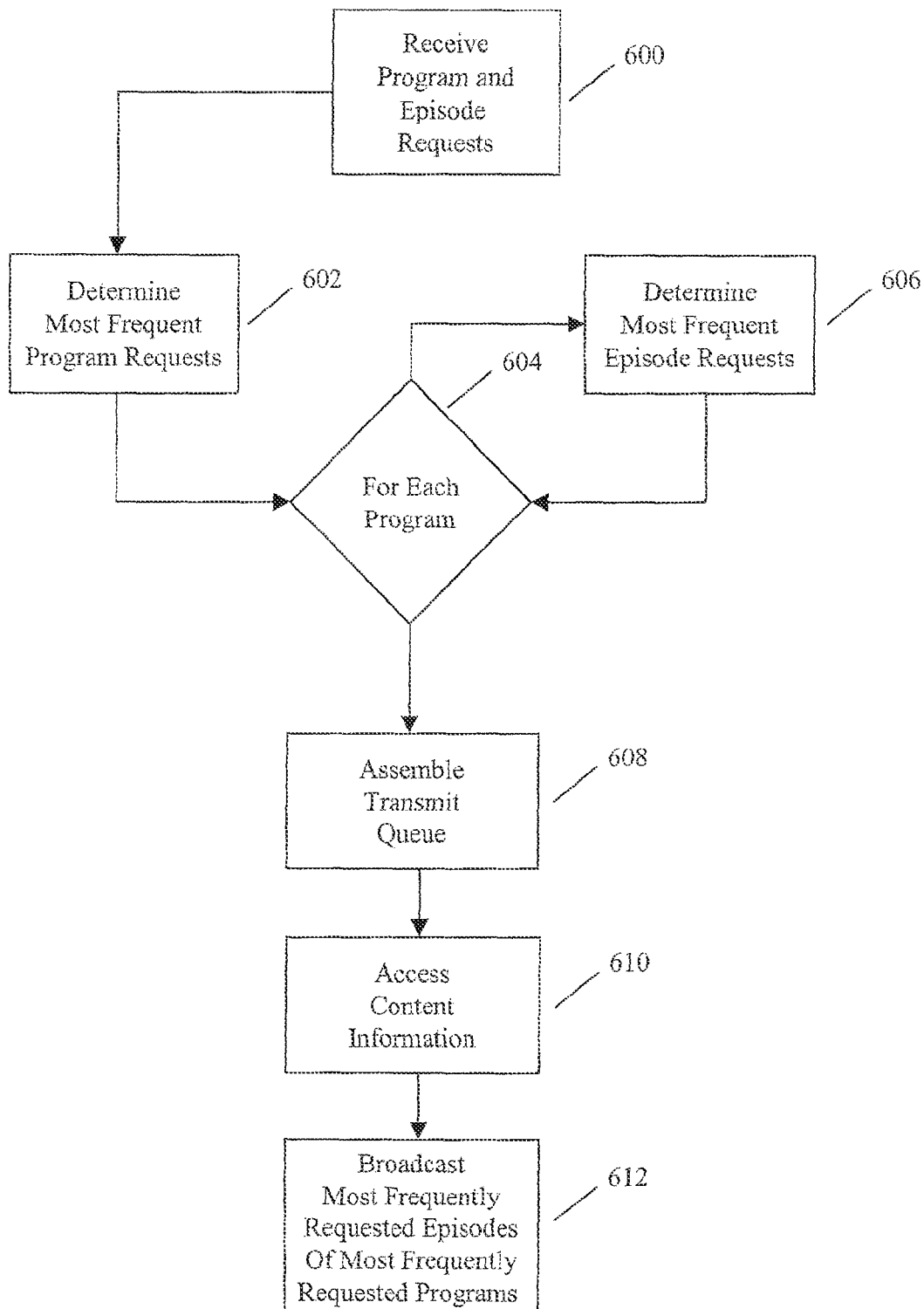
FIG. 6 depicts a method for applying the present invention to programs and program episodes.

In addition to optimizing utilization of system bandwidth for data services, the present invention may also be employed to optimize program broadcast bandwidth. For example, a broadcaster may offer a favorites weekend where favorite programs and favorite episodes of favorite programs are presented. The present invention may be employed in a tiered fashion such that a first implementation determines the frequency of request for types of programs and a second implementation determines the frequency of request for content of frequently requested programs. FIG. 6 depicts a method for applying the present invention to programs and program episodes At step 600 requests for program episodes are received. At step 602 the most frequent program requests are determined. Steps 604 and 606 intemperate such that the most requested episodes for each of the most requested programs are determined. At step 608 a transmit queue is assembled. At step 610, content information is accessed, and at step 612 the most frequently requested episodes of most frequently requested programs are broadcast. The method illustrated in FIG. 6 may employ decision criteria such that if the vast majority of episode requests are for the same program, then a presentation may comprise episodes of that one program. Alternatively, decision criteria may be employed such that a variety of programs may be presented with the most requested episodes for each program. The method illustrated in FIG. 6 may also be employed to select between types of presentations, such as stock quotes, music charts, and sports scores, for example, wherein a first determination is used to establish a frequency of presentation, and a second determination may be employed to determine the frequency of presentation of information within each presentation type. The present invention may employ long term information to produce trend based program and item selection, or may employ short-term information to provide dynamic and real-time selection of broadcast content. Advantageously, the present invention provides for optimized viewer satisfaction while efficiently using available bandwidth by presenting most requested content, or most requested content types and most requested elements of those content types, at frequent intervals and presenting less requested content or less requested content types at less frequent intervals.

The foregoing description of the invention has been presented for purposes of illustration and description, it is not intended to be exhaustive or to limit the invention to the precise form disclosed, and other modifications and variations may be possible in light in the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

The invention claimed is:

1. A method for transmitting requested content, the method comprising:
   receiving at least one request for a content type and an element within the content type;
   based on the at least one received request, determining most frequently requested content types and most frequently requested elements within each of the most frequently requested content types;
   determining, by a processor of a machine, a transmit rate for each of the frequently requested content types, the frequently requested content types with a higher request count receiving a higher transmit rate than frequently requested content types with a lower request count, the transmit rate indicating a frequency for transmission of the most frequently requested content types; and
   transmitting the most frequently requested elements within each of the most frequently requested content types at the determined transmit rate in response to a request for content.

2. The method of claim 1, wherein:
   the most frequently requested content types comprise programs and the most frequently requested elements comprise program episodes;
   the determining the most frequently requested elements within each of the most frequently requested content types comprises determining most frequently requested program episodes within each most frequently requested program; and
   the transmitting the most frequently requested elements within each of the most frequently requested content types comprises transmitting the most frequently requested program episodes within each of the most frequently requested program.

3. The method of claim 1, wherein the most frequently requested content types comprise a sports score type and the most frequently requested elements comprise scores of most frequently requested teams within the sports score type.

4. The method of claim 1, further comprising maintaining a request count for each content type, the request count for each content type indicating a number of times each content type has been requested, the request count being used to determine the most frequently requested content types.

5. The method of claim 4, further comprising maintaining a request count for each element within each content type, the request count for each element indicating a number of times each element has been requested, the request count being used to determine the most frequently requested content elements.

6. The method of claim 1, further comprising grouping content types and elements with a request count greater than or equal to a predetermined access count into a transmit group.

7. The method of claim 6, wherein:
   determining the transmit rate for each of the frequently requested content types comprises determining a group transmit rate for the transmit group, the transmit group with a higher request count receiving a higher associated group transmit rate than a transmit group with a lower request count, the group transmit rate indicating how often the transmit group is to be transmitted, and
   the transmitting the most frequently requested elements comprises repeatedly transmitting the transmit group at the group transmit rate.

8. The method of claim 6, further comprising:
   determining a maximum size for the transmit group; and
   based on the maximum size not being reached, adding an additional element having the request count greater than or equal to the predetermined access count to the transmit group.

9. A system for transmitting content, the system comprising:
   one or more databases containing a plurality of content item and user request information for the content items, the content items comprising elements of a content type;
   a transmit unit; and
   a tangible machine-readable storage medium storing instructions that, when executed by at least one processor of a machine, cause the machine to perform operations comprising:
      determining most frequently requested content types and most frequently requested content items within each of the most frequently requested content types;
      determining a transmit rate for each of the frequently requested content types, the frequently requested content types with a higher request count receiving a higher transmit rate than frequently requested content types with a lower request count, the transmit rate indicating a frequency for transmission of the most frequently requested content types; and
      transmitting the most frequently requested content items within each of the most frequently requested content types at the determined transmit rate in response to a request for content.

10. The system of claim 9, wherein the transmit unit comprises one of a television transmitter or a server coupled to a network.

11. The system of claim 9, wherein the transmit rate is further responsive to available bandwidth for content item transmission.

12. The system of claim 9, wherein the transmit rate is further responsive to a duration of each content item within the content type.

13. The system of claim 9, wherein:
   the most frequently requested content types comprise programs and the most frequently requested content items comprise program episodes;
   the determining the most frequently requested content items within each of the most frequently requested content types comprises determining most frequently requested program episodes within each most frequently requested program; and
   the transmitting the most frequently requested content items within each of the most frequently requested content types comprises transmitting the most frequently requested program episodes within each of the most frequently requested program.

14. The system of claim 9, wherein the most frequently requested content types comprise a sports type and the most frequently requested content item comprise information of most frequently requested teams within the sports type.

15. The system of claim 9, wherein the operations further comprise maintaining a request count for each content item within each content type, the request count for each content item indicating a number of times each content item has been requested, the request count being used to determine the most frequently requested content item.

16. The system of claim 9, wherein the operations further comprise:

grouping content types and content items with a request count greater than or equal to a predetermined access count into a transmit group;
determining a maximum size for the transmit group; and
based on the maximum size not being reached, adding an additional content item having a request count greater than or equal to the predetermined access count to the transmit group.

17. The system of claim 9, wherein the operations further comprise:
grouping content types and content items with a request count greater than or equal to a predetermined access count into a transmit group;
determining a maximum size for the transmit group; and
based on the maximum size being reached, selecting a next transmit group to perform a determination of whether a maximum size for the next transmit group is reached.

18. The system of claim 9, wherein the determining the most frequently requested content items comprises:
creating a request count for each content item of the plurality of content items, the request count incremented for each request for each content item of the plurality of content items;
sorting the plurality of content items based on the corresponding request count; and
identifying content items having request counts sorted higher than a reference request count.

19. The system of claim 18, wherein the request count comprises a number of requests received during a predefined time period for each content item of the plurality of content items.

20. A machine-readable medium having no transitory signals and storing instructions that, when executed by a processor of a machine, cause the machine to perform operations comprising:
receiving a plurality of requests, each request indicating a request for an element within a content type;
analyzing the plurality of requests to determine most frequently requested content types and most frequently requested elements within each of the most frequently requested content types;
determining a transmit rate for each of the frequently requested content types, the frequently requested content types with a higher request count receiving a higher transmit rate than frequently requested content types with a lower request count; and
transmitting the most frequently requested elements within each of the most frequently requested content types at the determined transmit rate in response to a request for content.

* * * * *